July 6, 1937. M. ALPERN 2,086,203
FLUID CONTROL SYSTEM
Filed July 5, 1934 3 Sheets-Sheet 2

Inventor
Maxwell Alpern
By Carl F. Libbe
Attorney

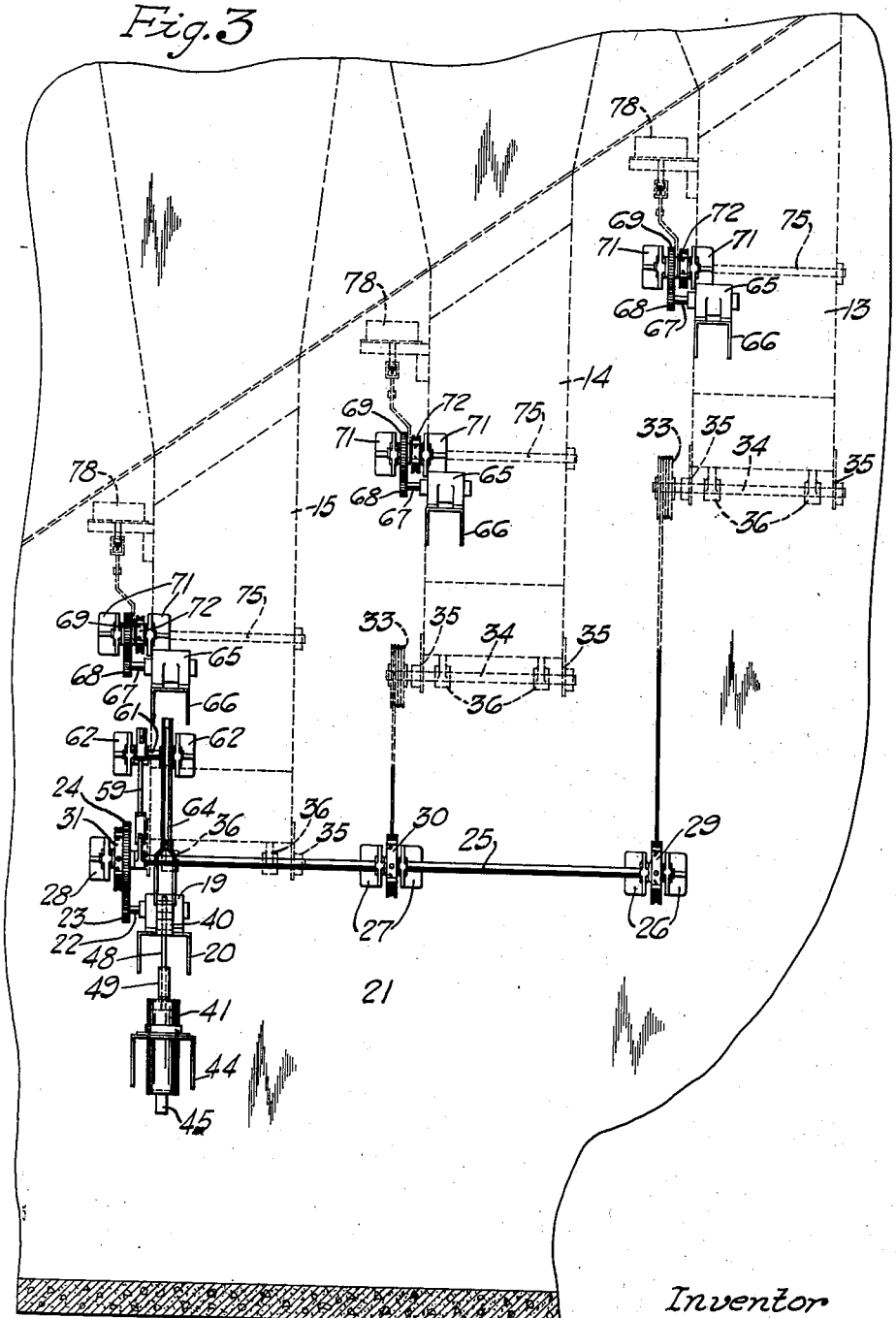

Patented July 6, 1937

2,086,203

UNITED STATES PATENT OFFICE 2,086,203

FLUID CONTROL SYSTEM

Maxwell Alpern, Philadelphia, Pa., assignor to American Engineering Company, Philadelphia, Pa., a corporation of Pennsylvania Application July 5, 1934, Serial No. 733,772

16 Claims. (Cl. 137—78)

This invention relates to fluid systems, and more particularly to the means for controlling the flow of fluid through said systems.

The present invention involves a fluid system including a plurality of ducts or passages which lead from a common pressure chamber to sectionalized groups of tuyères when employed in connection with stoker furnaces or to the various rooms when employed in connection with ventilating systems or hot air heating systems. Each duct is provided with a throat damper and a control damper. The throat dampers of the ducts are interconnected for simultaneous operation, and are adjusted by mechanism controlled by the pressure in the pressure chamber. Each of the control dampers is provided with independent operating means controlled by the differential in pressure across the throat of its associated duct. A fluid system mechanism of this general character is shown and described in my pending application Serial No. 614,132, filed May 27, 1932, and the present invention contemplates an improvement over that disclosed in said application.

One object of the present invention is to provide a highly sensitive control means for a fluid system of the stated character which responds to each change in pressure in said system.

Another object is to provide power means such as electric motors for adjusting the throat and control dampers to various positions of adjustment.

A further object is to provide a novel control means for each of the damper operating motors comprising a control switch and a pressure responsive device for controlling the operation of said switch.

A further object is to provide a followup mechanism for each of the control switches which functions to effect deenergization of the associated motor when the damper has been adjusted thereby the proper amount toward either open or closed position.

Other and further objects will become apparent as the description of the invention progresses.

Of the drawings:

Fig. 3 is a side elevational view taken substantially along line 3—3 of Fig. 2.

Fig. 4 is an elevational view partly in section of the control mechanism for one of the control dampers.

Figure 2:
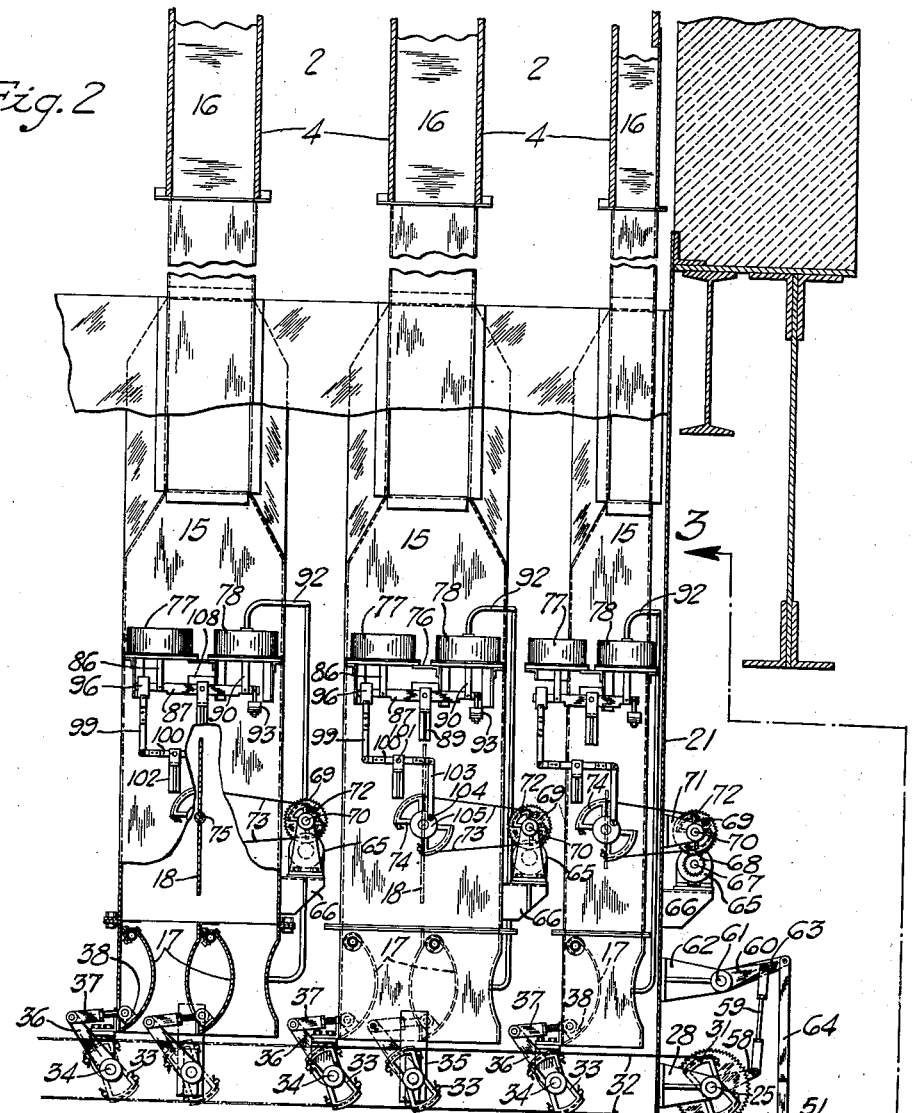
Fig. 2 is an elevational view partly in section taken substantially along line 2—2 of Fig. 1.

Referring to the drawings, the invention is shown for the purpose of illustration, as applied to a stoker 1 of the multiple retort underfeed type, although it is equally applicable to stokers of other types. Stoker 1 comprises alternately disposed retorts 2 and tuyère rows 3, the side walls of which being formed by spaced parallel plates 4 as shown in Fig. 2. Extension grates 5 provided at the rear end of the stoker feed the consumed fuel into an ash pocket 6. Fuel is fed to the retorts 2 from hoppers 7 by any suitable feeding mechanism (not shown) driven by a power mechanism shown at 8.

Figure 1:
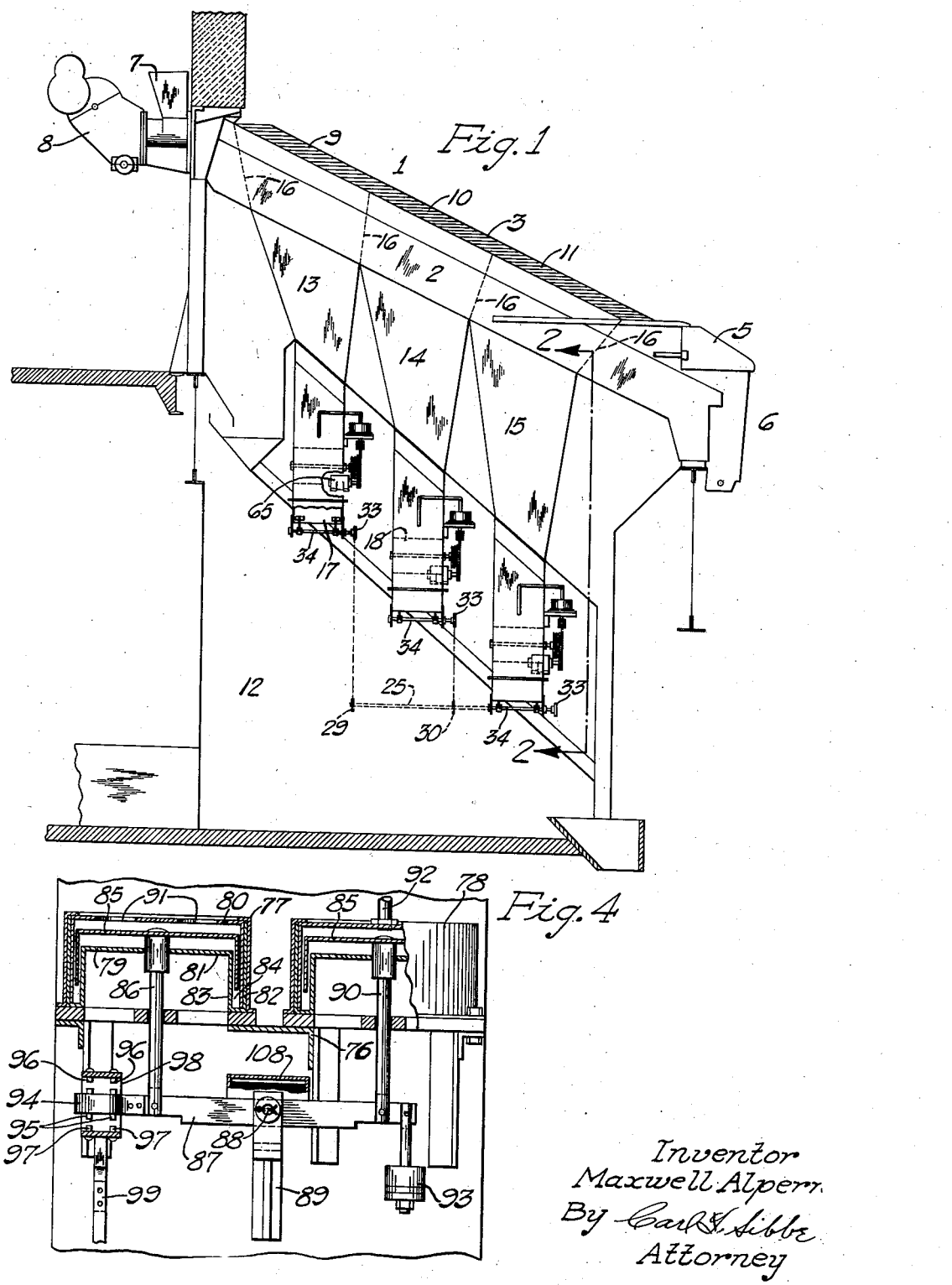
Fig. 1 is a sectional elevational view taken through a stoker showing the arrangement of the ducts longitudinally thereof, and the operating mechanisms for the dampers associated with said ducts.

As shown in Fig. 1, the tuyères of each row are divided into three groups 9, 10 and 11, from front to rear of the stoker, and air is delivered thereto from a common pressure chamber 12 through ducts 13, 14 and 15 respectively. Air may be delivered to pressure chamber 12 by any suitable fan mechanism (not shown) which may be so controlled as to automatically respond to changes in boiler ratings to vary the supply. The ducts 13, 14 and 15 for each of the groups of tuyères 9, 10 and 11 respectively, are secured to the lower edges of the side plates 4 and extend downwardly into the pressure chamber 12 and partition plates 16 extend from the top of the end walls of each duct to the bottom of the tuyères. The walls defining chamber 12 are sealed so that substantially all of the air fed thereto can escape only through the tuyères and extension grates.

Referring to Fig. 2, each duct is provided with a pair of throat dampers 17 and a control damper 18. The throats of the ducts are of substantially Venturi form, although any other suitable type may be employed. In certain installations it may be desirable to employ a single throat opening for each duct instead of two openings, as shown, and this obviously may be done without departing from the present invention.

The throat dampers 17 for all of the ducts are interconnected for simultaneous operation and are adjusted toward open or closed position by a reversible electric motor 19. Motor 19 is suitably mounted upon a supporting bracket 20 secured to the outside of one of the side walls 21 of chamber 12. The armature shaft 22 of motor 19 has secured thereto a pinion 23 which meshes with a gear 24 secured to a shaft 25 suitably journaled in bearing brackets 26, 27 and 28 secured to wall 21, as shown in Fig. 3. Also secured to shaft 25 in spaced relation are a series of sectional pulleys 29, 30 and 31 for operating the throat dampers 17 for the rows of ducts 13, 14 and 15 disposed transversely of the stoker.

As shown in Fig. 2, a pair of cables 32 secured at one end to pulley 31 extend through apertures in wall 21, and engage the opposite sides of each of a series of sectional pulleys 33 associated with the throat dampers 17 for each of the ducts 15. Pulleys 33 are each secured to an associated shaft 34 suitably journaled in brackets 35, secured to and depending from the end walls of said duct. Also secured to shaft 34 in spaced relation are a pair of levers 36 (Figs. 2 and 3) to the free end of which are pivotally connected respectively one end of a pair of adjustable links 37. The other ends of said links are pivotally connected respectively, to a pair of brackets 38 secured to the associated damper 17. The operating connections between sectional pulleys 29 and 30 and the throat dampers 17 for ducts 13 and 14 respectively, are similar in all respects to those between pulley 31 and the dampers 17 provided in the ducts 15; a detailed description of the operating connections therebetween is therefore believed to be unnecessary.

It therefore is seen that upon operation of motor 19 in one direction the throat dampers 17 for all of the ducts will be moved toward open position, and when the motor is operated in the reverse direction said dampers will be moved toward closed position.

Figure 5:
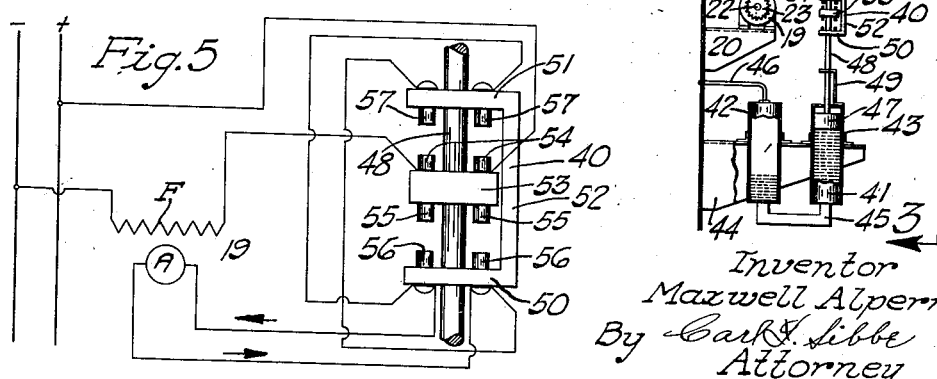
Fig. 5 is a wiring diagram of the circuit to one of the damper operating motors.

The electric motor 19 is controlled by a switch 40 actuated by a pressure regulator 41. Pressure regulator 41 comprises a pair of spaced parallel cylinders 42 and 43 mounted in any suitable manner in a bracket 44 secured to and extending outwardly from side wall 21. These cylinders contain a suitable fluid, such as a light oil, and are interconnected at the lower ends thereof by a tube 45. The upper end of cylinder 42 is connected to pressure chamber 12 by a tube 46. The upper end of cylinder 43 is open to atmospheric pressure and is provided with a float 47, the stem 48 of which is guided for movement in a bracket 49 secured to and extending upwardly from cylinder 43. The upper end of stem 48 extends through apertures provided in the substantially horizontal arms 50 and 51 of the floating yoke 52 of switch 40. Secured to stem 48 intermediate arms 50 and 51 is an insulated plate 53 having contact elements 54 extending therethrough and projecting beyond the upper and lower surfaces thereof. Arms 50 and 51 of yoke 52 are also provided with contact elements 56 and 57 respectively, which are adapted to engage the elements 54 carried by plate 53. By this arrangement it is seen that in the event the pressure in chamber 12 should increase plate 53 will be moved upwardly bringing contact elements 54 into engagement with elements 57. When this occurs current will flow through the armature A of motor 19 in the direction of the arrow, as shown in Fig. 5, causing said motor to operate in such a direction as to cause pulleys 29, 30 and 31 to be operated in a clockwise direction, which through the operating connections therebetween and dampers 17 will cause the latter to move toward open position. In order to deenergize motor 19 when the dampers 17 have been adjusted the proper amount a followup mechanism has been provided.

As shown more particularly in Figs. 2 and 3, shaft 25 has secured thereto an arm 58 to the outer end of which is pivotally connected the lower end of an adjustable link 59. The upper end of link 59 is pivotally connected to the free end of an arm 60 secured to a stub shaft 61 journaled in a bearing bracket 62, secured to and extending outwardly from wall 21. Also secured to shaft 61 is a second arm 63 which has pivotally connected to the outer end thereof a pair of links 64. The lower ends of links 64 are connected to arm 51 of yoke 52 in any suitable manner. By this arrangement, it is seen, that upon rotation of shaft 25 by motor 19 in a counterclockwise direction to effect opening of throat dampers 17, arms 58, 60 and 63 will also move in a counterclockwise direction, thereby causing link 64 to move upwardly, bringing contact elements 57 of yoke 52 out of engagement with contact elements 54. The motor will now come to rest and the dampers will be held in adjusted position. In the event the pressure in chamber 12 should decrease, float 47 will move downwardly in cylinder 43 thereby causing contact elements 54 to engage contact elements 56. The current through armature A of motor 19 will now be reversed and the motor will operate in reverse direction from which it was previously operated, thereby actuating pulleys 29, 30 and 31 in a clockwise direction which through their connections with dampers 17 cause the latter to move toward closed direction. Upon operation of the pulleys in this manner arms 58, 60 and 65 will move in a clockwise direction, thereby causing links 64 to move downwardly to bring contact elements 56 out of engagement with contact elements 54 and thus interrupt the circuit to motor 19.

An independent motor and control mechanism therefor is provided for each of the control dampers 18. Inasmuch as each of these mechanisms is similar in construction and operation, a description of one will suffice for all. For the purpose of illustration, the motor and control mechanism associated with one of the ducts 15 will now be described in detail.

Referring more particularly to Fig. 3, it will be observed that an electric motor 65 is supported upon a bracket 66, secured to and extending outwardly from one of the side walls of duct 15. The bracket 66 associated with the end duct 15 is secured to the outer side of wall 21. The armature shaft 67 of motor 65 has secured thereto a pinion 68 which meshes with a comparatively large gear 69 secured to a shaft 70 suitably journaled in brackets 71. A sectional pulley 72 is also secured to shaft 70 and has secured to the opposite sides thereof a pair of cables 73. The other ends of said cables engage the opposite sides of a sectional pulley 74 secured to one of the supporting pintles 75 of damper 18. Pintles 75 are journaled in suitable bearings provided in the end walls of the associated duct 15. By this arrangement it is seen that when motor 65 is operated in one direction damper 18 will be moved toward open position, and when said motor is operated in the reverse direction the damper will be moved toward closed position.

Mounted upon a suitable supporting bracket 76 are a pair of bell motors 77 and 78 which constitute the control means for motor 65.

Motors 77 and 78 are similar in construction and each comprises a casing 79 having spaced top and bottom walls 80 and 81 which terminate in downwardly extending side walls 82 and 83 defining an annular chamber 84. Side walls 82 and 83 are connected at the bottom so as to form a sealed chamber. A bell 85 extends into said annular chamber 84 and the substantially flat top portion thereof has secured thereto a rod 86 which is guided for movement in bottom wall 81 of casing 79, and in an aperture provided in the supporting framework 76. The lower end of rod 86 is pivoted near one end of a lever 87 which is fulcrumed intermediate its ends at 88 on a bracket 89 secured to one of the side walls of duct 15. Bell 85 of motor 78 has also secured thereto one end of a rod 90, the other end of which is pivotally connected near the opposite end of lever 87. The upper wall 80 of motor 77 is provided with a plurality of apertures 91 which establish communication between the upper surface of bell 85 and the pressure in chamber 12. The upper surface of bell 85 of motor 78 is connected to the pressure at the throat of duct 15 by a pipe 92. Since the pressure at the throat of the duct under operating conditions is always less than that in the pressure chamber weights 93 are provided to balance the motors 77 and 78 to retain the damper 18 in a certain position of adjustment for a given drop in pressure across the throat of the associated duct.

Weights 93 are suspended from the right hand end of lever 87 as shown in Fig. 4. It will be observed that the clearance space between each bell 85 and the inner and outer walls 83 and 82 respectively, of the associated casing 77 is very slight. By this arrangement the air leakage around the bell 85 is so slight as not to interfere with proper operation of the device. Under certain conditions a liquid seal may be provided in the annular chamber 84 but by reducing the clearance space between the walls of the chamber and the bell a liquid seal is unnecessary.

The left hand end of lever 87 (Fig. 4) is provided with an insulated portion 94 which carries contact elements 95 which project from the upper and lower sides thereof. Contact elements 95 are adapted to engage contact elements 96 or 97 provided in the upper and lower arms respectively, of a floating yoke 98. When the system is substantially balanced contact elements 95 assume a position substantially midway between contact elements 96 and 97, and out of engagement therewith. The lower end of yoke 98 has secured thereto the upper end of a link 99, the lower end of which is pivotally connected to a lever 100 fulcrumed intermediate its ends at 101 to a supporting bracket 102 secured to one of the end walls of duct 15. The other end of lever 100 has pivotally connected thereto the upper end of a link 103, the lower end of said link being pivoted at 104 to the hub portion 105 of pulley 74, as shown in Fig. 2.

It therefore is seen, that in the event the differential in pressure across the throat of duct 15 should change, bell motors 77 and 78 will be thrown out of balance, thereby causing lever 87 to rock either in a clockwise or counterclockwise direction, causing contact elements 95 thereof to engage either contact elements 96 or 97, as the case may be, thereby completing the circuit to motor 65. Upon operation of motor 65 pulley 74 will be rocked either in a clockwise or counterclockwise direction to move the associated damper 18 toward either open or closed position. Upon movement of pulley 74 in this manner yoke 98 will be moved either upwardly or downwardly, as the case may be, thereby bringing contact elements 96 or 97 out of engagement with contact elements 95, and thus interrupting the circuit to motor 65. When this occurs the motor will come to rest and the damper will remain in adjusted position until the differential in pressure across the throat of the duct again changes.

It has been found that the best results are obtained if less air is permitted to flow to the fuel bed than is necessary for proper combustion thereof, in the event a thin fire should develop over any of the ducts. By supplying less air than is required under these conditions, the fuel feeding mechanism will have the opportunity to build up the thin portions of the fuel bed until they again assume a normal thickness. It is also desirable to permit more air to flow to those portions of the fuel bed which become abnormally heavy than is necessary for proper combustion so as to increase the combustion rate until they become normal again.

In order to obtain the above results a shiftable weight 108 is provided. This weight is in the form of a sealed box, partly filled with a heavy liquid, such as mercury, and is secured to the upper edge of lever 87 in such a manner that the ends thereof extend an equal distance on either side of the fulcrum point 88. By this construction it will be observed that a greater rocking movement will be imparted to lever 87 in either direction than would be imparted thereto by operation of bell motors 77 or 78 alone with the result that contact elements 95 will remain in contact with elements 96 or 97 a greater length of time, thereby causing the damper 18 to move toward open or closed position a greater distance before the circuit to motor 65 is interrupted by the followup mechanism.

The wiring diagram shown in Fig. 5, which has been described in connection with the control circuit to motor 19, is also applicable to the motors 65 for adjusting each of the control dampers 18.

From the foregoing description it is thought that the operation of my improved fluid system is obvious. However, in order to correlate the various elements thereof a brief summary of the operation of the device as a whole will now be given.

As illustrated herein, the fluid control system is shown applied to a furnace stoker, and when so applied its primary function is to maintain the fuel bed normally uniform, and to insure the proper amount of draft air to each portion of the fuel bed so that efficient combustion of the fuel may take place. In constructions of this kind the switch 40 associated with motor 19 for actuating the throat dampers is so adjusted that the throat dampers 17 will assume a predetermined position for an average pressure in chamber 12. The same is true in regard to each of the control mechanisms associated with dampers 18, wherein the weights 93 are so proportioned as to balance the motors 77 and 78 for a predetermined fuel bed resistance with the dampers 18 positioned in such a manner as to permit the proper amount of air to flow to the fuel bed. Under these conditions the drop in pressure across the throat of each duct will remain substantially constant. In the event it is desired to operate the stoker at a higher rating a greater amount of air will be supplied to chamber 12 thereby increasing the pressure therein. When this occurs float 43 of pressure regulator 41 will move upwardly, thereby causing contact elements 55 to engage contact elements 57. Motor 19 will now be operated so as to adjust throat damper 17 toward open position. If the fuel bed continues to remain normally uniform, by opening these dampers an amount corresponding to the increase in pressure in chamber 12, the drop across the throats will remain constant.

Upon operation of motor 19 to adjust throat damper 17 toward open position, the followup mechanism associated therewith will actuate yoke 52 of switch 40 upwardly, bringing contact elements 57 out of engagement with contact elements 55, and thereby interrupting the circuit to motor 19. The dampers 17 will now remain in adjusted position until the pressure in chamber 12 again changes. In the event that it is desired to operate the stoker at a lower rating, less air will be fed to chamber 12 causing the pressure therein to decrease. When this occurs float 47 will move downwardly thereby bringing contact elements 54 into engagement with contact elements 56, thus closing the circuit to the motor and causing the latter to operate in the reverse direction to effect a movement of dampers 17 toward closed position. When the dampers have been adjusted in this manner the followup mechanism will again operate yoke 52 to bring contact elements 56 out of engagement with contact elements 54 to thereby interrupt the circuit to the motor. If the fuel bed remains normally uniform during this lower rating, the drop in pressure across the throat would still remain substantially constant.

Now, in the event the fuel bed over one of the ducts should become abnormally thin, it is apparent that due to the decreased resistance, the velocity of the air through the associated duct will increase with the result that a greater volume of air will flow therethrough than is necessary to insure complete combustion of the fuel. When this occurs the static pressure at the throat will decrease while the pressure in chamber 12 remains substantially the same, and consequently bell motor 77 will rock lever 87 in a counterclockwise direction (Fig. 4) causing elements 95 to make contact with elements 97. Motor 65 will now operate damper 18 toward closed position. Upon rocking of lever 87 in this manner the liquid in weight 108 will shift to the left, thereby imparting an additional movement to lever 87 and causing elements 95 and 97 to remain in contact until damper 18 has been moved a substantial distance toward closed position. Upon operation of the associated pulley 74 a predetermined amount, contact elements 97 will be moved out of engagement with elements 95 by virtue of the followup mechanism associated therewith to thereby interrupt the circuit to the motor. Damper 18 will now remain in its adjusted position until the fuel bed is built up by the fuel feeding mechanism. As the fuel bed becomes heavier the resistance to the flow of air through the duct becomes greater with the result that the static pressure at the throat thereof increases, thereby creating an unbalanced condition in the system. Bell motor 78 will now rock lever 87 in a clockwise direction to bring contact elements 95 into engagement with contact elements 96 to cause motor 65 to rotate in the reverse direction, thereby moving damper 18 toward open position. When damper 18 has been moved the proper distance toward open position, the followup mechanism will again operate to move contact elements 96 out of engagement with contact elements 95 to again interrupt the circuit to the motor 65.

In the event the fuel bed over any of the ducts should become abnormally heavy, it is obvious that the resistance to the free flow of air therethrough will be increased. When this occurs motor 78 will actuate lever 87 in a clockwise direction to bring contact elements 95 into engagement with contact elements 96, causing the associated motor 65 to operate the damper toward open position. The liquid in weight 108 will also shift to the right to thereby effect a greater movement of lever 87 with the result that contact elements 95 and 96 will remain in contact until damper 18 has moved a substantial distance toward open position. The followup mechanism will then interrupt the circuit to the motor and the damper will remain in adjusted position until the condition of the fuel bed again changes. As the fuel bed again approaches a normal thickness the resistance to the flow of air thereto decreases, causing an unbalanced condition in the system and the damper 18 is again actuated toward closed position to permit the proper amount of air to flow thereto, as previously described.

It therefore is seen that a highly sensitive control mechanism has been provided which automatically responds to each change in pressure in the system and thereby insures the proper flow of fluid in the various branches thereof under all conditions of operation.

It is also seen that the total flow of fluid through the ducts will remain substantially constant for any given pressure in chamber 12. For example, in the event the flow of fluid in any of the ducts should be throttled due to the occurrence of a thin fire thereover, the pressure in chamber 12 will increase slightly and thus cause a slightly greater amount of fluid to flow through some or all of the other ducts. Also should a greater than normal amount of fluid flow through certain of the ducts owing to the presence of an abnormally heavy fuel bed thereover, the pressure in chamber 12 will decrease slightly, and as a result the flow of fluid through the remaining ducts will be slightly less than normal. The total flow of fluid through all of the ducts, however, will remain substantially constant.

While the invention has been shown as applied to stoker furnaces, it is believed to be apparent that it is also adaptable for use in connection with other apparatus wherein automatic control of fluid is desired. Therefore, it is to be understood that the invention is not to be limited to the embodiment herein shown and described since it may be embodied in other forms, all coming within the scope of the claims which follow.

What is claimed is:

1. In a fluid system, the combination with a pressure chamber and a duct extending into said chamber, of an adjustable damper for said duct, a reversible electric motor for adjusting said damper, a switch for controlling the operation of said motor, means responding to the pressure in said chamber for closing said switch, and followup means operated by said motor for opening said switch to interrupt the circuit to said motor when said damper has been adjusted a predetermined amount in either direction.

2. In a fluid system, the combination with a source of fluid supply, of a duct communicating with said source of fluid supply and having a restricted throat opening, a damper in said duct for controlling the flow of fluid therethrough, an electric motor for adjusting said damper, means responding to the differential in pressure across said throat for controlling the operation of said motor, and followup means operated by said motor for rendering said control means inoperative when said damper has been actuated to a new position of adjustment.

3. In a fluid system, the combination with a pressure chamber and a duct extending into said chamber, of an adjustable throat for said duct, a motor for adjusting said throat, means responding to the pressure in said chamber for controlling the operation of said motor, a control damper for said duct, and means responding to the differential in pressure across said throat for controlling the operation of said damper.

4. In a fluid system, the combination with a pressure chamber and a duct extending into said chamber, of an adjustable throat for said duct, a reversible electric motor for adjusting said throat, means responding to the pressure in said chamber for controlling the operation of said motor, a control damper for said duct, a reversible electric motor for adjusting said control damper, and means responding to the differential in pressure across said throat for controlling the operation of said last mentioned motor.

5. In a fluid system, the combination with a pressure chamber, and a duct extending into said chamber, of a pair of adjustable throats for said duct, a reversible electric motor for adjusting said throats, a switch controlling the operation of said motor, means responding to the pressure in said chamber for closing said switch whereby the motor will actuate said damper toward open or closed position, followup means for opening said switch when said throat has been adjusted a predetermined distance to thereby interrupt the circuit to said motor, a control damper for said duct, a reversible electric motor for adjusting said damper, a switch for controlling the operation of said motor, means responding to the differential in pressure across said throat for actuating said switch to thereby effect an adjustment of said damper, and followup means for opening said switch when said damper has been actuated to adjusted position.

6. In a fluid system, the combination with a pressure chamber and a plurality of ducts extending into said chamber, of an adjustable damper provided in each of said ducts, means interconnecting said dampers for simultaneous movement in the same direction, a motor for actuating said dampers, and means responding to the pressure in said chamber for controlling the operation of said motor.

7. In a fluid system, the combination with a source of fluid supply, of a plurality of passages communicating with said source of fluid supply, damper means provided in each of said passages for varying the flow of fluid therethrough, power means for simultaneously actuating all of said damper means in the same direction, and means controlling the operation of said power means, said parts cooperating to maintain the total flow through said passages substantially constant for any given pressure at said source of fluid supply.

8. In a fluid system, the combination with a source of fluid supply, of a plurality of passages communicating with said source of fluid supply, a damper in each of said passages for varying the flow of fluid therethrough, an electric motor for simultaneously actuating all of said dampers in the same direction to different positions of adjustment, and means controlling the operation of said electric motor, said parts cooperating to maintain the total flow through said passages substantially constant for any given pressure at said source of fluid supply.

9. In a fluid system, the combination with a pressure chamber and a plurality of ducts extending into said chamber, of an adjustable throat for each of said ducts, means interconnecting said throats for simultaneous adjustment, a motor for adjusting said throats, means responsive to the pressure in said chamber for controlling the operation of said motor, a control damper provided in each of said ducts, a motor for actuating each of said control dampers, and individual control means for each of said motors responsive to the differential in pressure across the throat of its respective duct.

10. In a fluid system, the combination with a pressure chamber, and a plurality of ducts extending into said chamber, of an adjustable throat for each of said ducts, means interconnecting said throats for simultaneous adjustment, a reversible electric motor for adjusting said throats, a switch for controlling the operation of said motor, means responsive to the pressure in said chamber for closing said switch, followup means for opening said switch when said throats have been adjusted a predetermined amount, a control damper for each of said ducts, a reversible electric motor for adjusting each of said control dampers, a switch for each of said motors, individual control means responding to the differential in pressure across the throat of its respective duct for closing said switch, and followup means for opening said switch when the damper has been actuated to a new position of adjustment.

11. In a fluid system, the combination with a pressure chamber and a duct having a pair of throat openings of substantially Venturi form extending into said chamber, of a damper in said duct for controlling the flow of fluid therethrough, a motor for adjusting said damper, and control means for said motor, said control means comprising a pair of bell motors, one of said motors being subjected to the pressure in said chamber, and the other of said bell motors being connected to the pressure at the throat of said duct, and means for balancing said motors for a predetermined differential in pressure across said throat.

12. In a fluid system, the combination with a pressure chamber, and a duct having a substantially Venturi throat extending into said chamber, of an adjustable damper for said duct, a reversible electric motor for adjusting said damper, and control means for said motor, said control means comprising a pair of bell motors, a reversing switch operatively connected to said bell motors, one of said bell motors being subjected to the pressure in said chamber, and the other of said bell motors being connected to the pressure of the throat of said duct, and means for balancing said bell motors for a predetermined differential in pressure across said throat.

13. In a fluid system, the combination with a pressure chamber and a duct having a substantially Venturi throat extending into said chamber, of an adjustable damper for said duct, a reversible electric motor for adjusting said damper, and means for controlling the operation of said motor, said means comprising a pair of bell motors, one of which being connected to the pressure in said chamber, and the other being connected to the pressure at said throat, and a switch having relatively movable contact elements, means operatively connecting one of said elements to said bell motors, a followup mechanism operatively connecting the other of said elements to said damper, said switch being so constructed that upon actuation of said first mentioned elements into engagement with the others by operation of said bell motors, said last mentioned elements will be moved out of engagement with said first mentioned elements upon operation of said damper to adjusted position, and a shiftable weight for prolonging contact between said elements.

14. In a fluid system, the combination with a pressure chamber, of a duct extending into said chamber, an adjustable damper for said duct, a motor for actuating said damper to different positions of adjustment, adjustable control means for said motor, means responding to the pressure in said chamber for actuating said control means to operative position, and followup means operated by said motor for actuating said control means to inoperative position when said motor has actuated said damper to a new position of adjustment.

15. In a fluid system, the combination with a pressure chamber, of a duct extending into said chamber, an adjustable damper for said duct, a reversible motor for actuating said damper to different positions of adjustment, control means for said motor, means responding to the pressure in said chamber for actuating said control means to operative position, and followup means operated by said motor for actuating said control means to inoperative position when said motor has actuated said damper to a new position of adjustment.

16. In a fluid system, the combination with a pressure chamber, of a duct having a throat opening extending into said chamber, an adjustable damper for said duct, a reversible motor for actuating said damper to different positions of adjustment, control means for said motor, means responding to the changes in the differential in pressure across the throat of said duct for actuating said control means to operative position, and followup means operated by said motor for actuating said control means to inoperative position when said motor has actuated said damper to a new position of adjustment.

MAXWELL ALPERN.